United States Patent [19]

Koteles et al.

[11] Patent Number: 4,729,926
[45] Date of Patent: Mar. 8, 1988

[54] PACKAGING MATERIAL FOR LONG-TERM STORAGE OF SHELF STABLE FOOD PRODUCTS AND METHOD OF MAKING SAME

[75] Inventors: Randal M. Koteles, Gray Court; John G. Bradfute, Greer, both of S.C.

[73] Assignee: W. R. Grace & Co., Cryovac Div., Duncan, S.C.

[21] Appl. No.: 936,997

[22] Filed: Dec. 4, 1986

Related U.S. Application Data

[63] Continuation of Ser. No. 864,170, May 16, 1986, abandoned.

[51] Int. Cl.⁴ .................. B32B 27/08; B32B 27/30; B32B 27/32; B32B 27/34
[52] U.S. Cl. ................ 428/474.7; 156/244.11; 156/244.22; 264/176.1; 264/177.18; 428/474.9; 428/475.8; 428/476.3; 428/516; 428/518
[58] Field of Search ............ 156/244.11, 244.22; 264/176 R; 428/475.5, 475.8, 476.3, 516, 518, 474.7, 474.9

[56] References Cited

U.S. PATENT DOCUMENTS

| | | | |
|---|---|---|---|
| 4,178,401 | 12/1979 | Weinberg et al. | 428/516 |
| 4,182,457 | 1/1980 | Yamada et al. | 428/35 |
| 4,284,674 | 8/1981 | Sheptak | 428/475.5 |
| 4,355,721 | 10/1982 | Knott et al. | 428/475.8 |
| 4,398,635 | 8/1983 | Hirt | 206/532 |
| 4,405,667 | 9/1983 | Christensen et al. | 428/475.5 |
| 4,407,873 | 10/1983 | Christensen et al. | 428/35 |
| 4,501,798 | 2/1985 | Koschak et al. | 428/475.8 |
| 4,532,189 | 7/1985 | Mueller | 428/516 |
| 4,568,580 | 2/1986 | Ghirardello et al. | 428/35 |
| 4,576,988 | 3/1986 | Tanaka et al. | 428/447 |
| 4,608,302 | 8/1986 | Schirmer | 428/516 |

FOREIGN PATENT DOCUMENTS 2014476A 8/1979 United Kingdom .
2106471A 4/1983 United Kingdom .
2121062A 12/1983 United Kingdom .

OTHER PUBLICATIONS

Ethylene Vinyl Alcohol Resins for Gas-Barrier Material T. Iwanami & Y. Hirai, TAPPI Journal, vol. 66, No. 10, Oct. 1983, pp. 85 to 90.
Technical Bulletin No. KIC-102 from Kuraray Gas Permeation of EVAL.

Primary Examiner—William J. Van Balen
Attorney, Agent, or Firm—John J. Toney; William D. Lee, Jr.; Mark B. Quatt

[57] ABSTRACT

A thermoplastic laminate suitable for long-term storage of shelf stable food products includes a first substrate comprising a layer of ethylene vinyl alcohol copolymer and a layer of a polyamide; and a second substrate bonded to the first substrate and comprising a vinylidene chloride copolymer. Polyamide may be included in a separate and distinct third substrate disposed between the first and second substrates.

16 Claims, 6 Drawing Figures

PACKAGING MATERIAL FOR LONG-TERM STORAGE OF SHELF STABLE FOOD PRODUCTS AND METHOD OF MAKING SAME

This application is a continuation of application Ser. No. 864,170 filed on May 16, 1986, now abandoned.

BACKGROUND OF THE INVENTION

This invention relates generally to the art of packaging films and more particularly to films useful in the packaging of food products.

It is common practice in packaging many goods, including food items, to use what is generally known as form-fill-seal equipment. In the vertical form-fill-seal arrangement, flexible packaging material is fed from a rollstock to a tube former where a tube is fashioned from the sheet material into a vertically dependent, upwardly open tube having overlapping longitudinal edges. These overlapping edges are subsequently sealed together longitudinally by means well known in the art and the end of the tube is sealed together by pairs of transverse heat seals which are vertically spaced apart. At this point the tube is filled with a measured quantity of the product to be packaged. A second heat sealing operation, typically performed after the filled tube has been downwardly advanced, completes enclosure of the product. Simultaneously with or shortly after the transverse heat sealing step the tube is completely transversely severed by known cutting means in a space between the vertically spaced apart pairs of transverse heat seals. Thereafter the tube is downwardly advanced and the cycle is successively repeated so as to form a multiplicity of individually packaged products.

Alternatively, a single transverse heat seal including a pair of horizontally spaced apart sealing jaws may be used to form in effect two vertically adjacent heat seals which are simultaneously or subsequently severed at a line vertically intermediate the heat seals.

Flexible packing material useful for this as well as other applications typically must meet stringent requirements imposed by the particular food or other article to be packaged. In some cases, for example in high acid foods such as tomato paste and other tomato products, the package must be capable of adequately protecting the food item after packaging and through the distribution cycle until the packaged product reaches the end user at point of sale.

Additionally, products such as those described above are sometimes introduced into the form tube at relatively high temperatures of about 200° F. The formed package must be able to withstand the still relatively high temperatures immediately after packaging, and subsequent cooling operations to bring the package to room temperature or other desired temperature range. Dimensional stability of the packaging material in such high temperature regimes is necessary to prevent warping and distortion of the package after filling.

The flexible material must also have sufficient abuse resistance to physical and mechanical abuse imposed by the entire form-fill-seal or other packaging system.

Yet another requirement of packaging material, especially in form-fill-seal systems, is good heat sealability with respect to the transverse heat seals, which are typically subjected to loading forces from the introduced product such as food product, soon after the heat seal is formed.

Limited oxygen transmission through the packaging material under both low and high humidity conditions is an essential feature of a packaging material for long-term storage of oxygen sensitive food products. This oxygen barrier feature should maintain the packaged food products for an extended period of twelve months of more.

Of interest in U.S. Pat. No. 4,284,674 issued to Sheptak and disclosing a multilayer film having a core layer of ethylene vinyl alcohol copolymer adhered on each side to nylon, each nylon layer in turn being adhered to a chemically modified polyolefin, and a further layer of primer material suitable to adhere the modified polyolefin to an outer layer of polypropylene of other materials suitable for conveying toughness, flex-crack resistance and moisture barrier properties to the multi-ply film.

Also of interest is U.S. Pat. No. 4,355,721 issued to Knott et al and disclosing a coextruded multilayer sheet having a first layer of nylon, an EVOH barrier layer, another layer of nylon, an adhesive layer, and another outside layer of, for example, high density polyethylene.

Of interest is U.S. Pat. No. 4,398,635 issued to Hirt and disclosing a medication package in which a coextruded multiple layer sheet may have a structure including a layer of ethylene vinyl alcohol copolymer sandwiched between adjacent layers of nylon, and in which one of the nylon layers may be further adhered to a tie resin. The nylon layers may form either an outside surface or, in one example, internal layers with additional layers of polymeric materials added to each side of the sandwich structure.

Of interest is U.S. Pat. No. 4,407,873 issued to Christensen et al, disclosing a packaging material for retort applications including a heat seal layer of linear low density polyethylene, a second layer of linear low density polyethylene with optionally 0% to 80% medium density polyethylene blended into the second layer, a third layer of anhydride modified medium density polyethylene, a fourth layer of nylon, a fifth layer of ethylene vinyl alcohol copolymer, and a sixth layer of nylon.

It is an object of the present invention to provide a thermoplastic laminate suitable for the packaging of food products, especially high acid content food products at relatively high temperatures.

It is a further object of the present invention to provide a thermoplastic laminate useful in connection with form-fill-seal machines, especially vertical form-fill-seal machines.

It is still another object of the present invention to provide a thermoplastic laminate which provides extended shelf life of twelve months or more to food products such as high acid content food products.

It is yet another object of the present invention to provide a thermoplastic laminate which can be made into a package for food products which can be reheated in boiling water without delamination or breakage.

It is also an object of the present invention to provide a thermoplastic laminate with good oxygen barrier properties at both low and high relative humidities.

One particularly useful feature of this package is its usefulness in packaging food products currently packaged in No. 10 metal cans. These can are expensive and bulky, and present a disposal problem after use of the contained food product. Utilizing the multilayer film of the present invention, many food products now packaged in the No. 10 can can be conveniently and quickly packaged, stored for an extended period of time, shipped, marketed, and sold to the end user such as a commercial or institutional user or a consumer. After use, the emptied package made from the multilayer laminate provides a much less bulky package for disposal.

SUMMARY OF THE INVENTION

A thermoplastic laminate, in accordance with the present invention, comprises a first substrate comprising a layer of ethylene vinyl alcohol copolymer, and a layer of a polyamide; and a second substrate bonded to the first substrate and cmprising a vinylidene chloride copolymer.

In another aspect of the present invention, a thermoplastic laminate comprises a first substrate comprising a layer of an ethylene vinyl alcohol copolymer and a layer of a polyamide; a second substrate comprising a vinylidene chloride copolymer; and a third substrate disposed between and bonded to the first and second substrates and comprising a polyamide.

DEFINITIONS

The terms "linear low density polyethylene", "LLDPE", and the like are used herein to refer to copolymers of ethylene with one or more comonomers selected from $C_4$ to $C_{10}$ alphaolefins such as butene-1, octene, etc. in which the molecules of the copolymers comprise long chains with few side chain branches or cross-linked structures. This molecular structure is to be contrasted with conventional low or medium density polyethylene which are more highly branched than their respective counterparts. "LLDPE" as defined herein has a density usually in the range of from about 0.916 grams per cubic centimeter to about 0.925 grams per cubic centimeter.

The term "polyamide" refers to high molecular weight polymers having amide linkages along the molecular chain, and refers more specifically to synthetic polyamide such as various nylons.

The terms "intermediate layer", "interior layer", and the like are used herein to define a layer in a multilayer film bounded on both sides by other layers.

The terms "anti-blocking agent" and the like are used herein to describe substances that reduce the tendency of films or sheets of polyolefin film to stick or adhere to each other or to other surfaces when such adhesion is otherwise undesirable. Typical chemicals such as colloidal silica, finely divided silica, clays, silicons, and certain amides and amines are useful in this application.

The term "ethylene vinyl alcohol copolymer" is used herein to describe a vinyl alcohol copolymer having an ethylene comonomer, and prepared by for example, hydrolysis of vinyl acetate copolymers, or by chemical reactions with polyvinyl alcohol.

The term "vinylidene chloride copolymer" is used herein to refer to various copolymers of vinylidene chloride with comonomers such as vinyl chloride, various acrylates, and nitriles. These copolymers are commonly referred to as saran, and are characterized by good oxygen barrier properties, especially at high relative humidities, and good moisture barrier properties.

The term "tie layer" refers herein to a layer of a multilayer film or laminate which adheres two other layers to each other by chemical and/or physical mechanisms.

BRIEF DESCRIPTIONS OF THE DRAWINGS

Details of the present invention are provided by reference to the drawing figures wherein.

DESCRIPTION OF THE PREFERRED EMBODIMENTS

Figure 1:
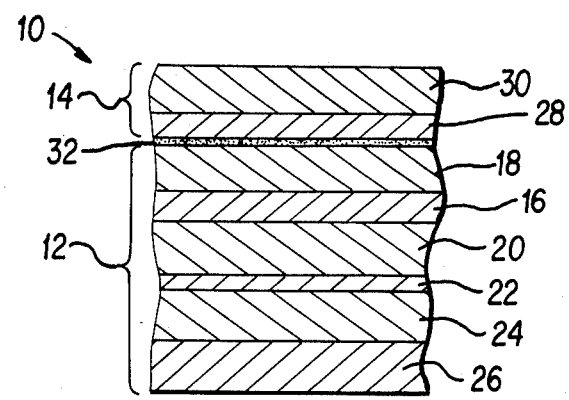
FIG. 1 is a schematic cross section of a preferred embodiment of a multilayer laminate of the invention.

The structure depicted in FIG. 1 is directed to a thermoplastic laminate 10 having a first substrate 12 and second substrate 14, each comprising a multilayer film.

First substrate 12 includes a layer 16 of an ethylene vinyl alcohol copolymer adhered on each surface to layers 18 and 20 respectively, each comprising a polyamide. A suitable ethylene vinyl alcohol copolymer is EVAL ECF101 available from EVAL Company of America. Preferred polyamides for layers 18 and 20 are nylon 6, nylon 12, and nylon 6/12. Capron 8207F, commercially available from Allied Chemical Company is a suitable nylon. Layer 18 provides a bonding surface for bonding by, for example, a lamination adhesive to second substrate 14.

Polyamide layer 20 is adhered by means of a tie layer 22 to a layer 24 comprising a low density polyethylene. Tie layer 22 is preferably a chemically modified polymeric material such as Plexar 3 available from Norchem. This particular adhesive is an ethylene vinyl acetate-based modified adhesive. A suitable low density polyethylene for layer 24 is 3404 available from Norchem. Sealant layer 26 comprises a linear low density polyethylene.

An alternate first substrate can be substantially as just described, but without low density polyethylene layer 24.

Referring now to second substrate 14 of FIG. 1, a bonding layer 28 comprises a vinylidene chloride copolymer bonded to a sealant layer 30 comprising a liner low density polyethylene such as Dowlex 2045 from Dow Chemical Company. Preferred sarans are vinylidene chloride vinyl chloride copolymers available from Dow and Solvay. Sealant layer 30 may also comprise a blend of two linear low density polyethylene resins, such as a blend of 70% Dowlex 2045 and 30% Dowlex 2035, both resins available from Dow Chemical Company.

Dowlex 2045 is a copolymer of ethylene and octene with a density at 23° C. of about 0.920 grams per cubic centimeter and a melt flow index (ASTM-D-1238) of from about 0.7 to about 1.2 grams per ten minutes. Dowlex 2035 is a linear low density polyethylene with a melt flow index (ASTM-D-1238) of about 6.

The adhesive layer 32 representing, for example, a lamination adhesive, serves to laminate first substrate 12 to second substrate 14. The adhesive layer 32, and the other adhesive layers depicted in the other drawing figures, are shown with exaggerated thickness in solid shading for purposes of clarity. In practice, lamination adhesives forming these adhesive layers are typically very thin.

Figure 2:
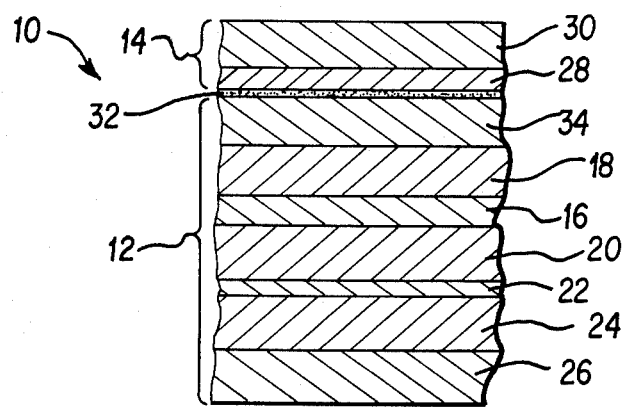
FIG. 2 is a schematic cross section of another embodiment of a multilayer laminate in accordance with the invention.

Referring now to FIG. 2 of the drawings, a thermoplastic laminate similar of that of FIG. 1 is shown, in which an additional layer 34 forms part of first substrate 12. Layer 34 functions as the bonding layer for the first substrate 12, and is preferably a polyamide and more preferably a copolyamide such as a nylon 6/nylon 12 copolyamide, Grillon CR-9 copolyamide, available from Emser Industries.

Figure 3:
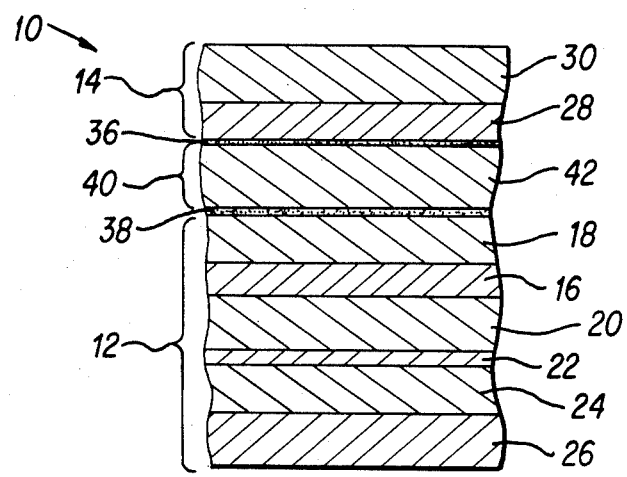
FIG. 3 is a schematic cross section of another embodiment of the laminate in accordance with the invention.

FIG. 3 of the drawings illustrates a thermoplastic laminate 10, having a first substrate 12, and second substrate 14, and a third substrate 40 disposed between the first two substrates and bonded to each of them. First substrate 12 is preferably a multilayer film such as the film described above and represented in FIG. 1. Similarly, second substrate 14 is preferably a multilayer film such as the second substrate 14 described with reference to FIG. 1.

Third substrate 40 preferably comprises a polyamide, more preferably a biaxially oriented polyamide layer 42. A preferred polyamide is a biaxially oriented version of the polyamide of layers 18 and 20. It has been found that in Form-Fill-Seal applications in which a heated food product is being packaged, biaxially oriented polyamide contributes to the dimensional stability of the package. The two opposite surfaces of layer 42 are bonding surfaces for adhering one surface of layer 42 to first substrate 12, and the opposite surface of layer 42 to second substrate 14, by for example lamination adhesion. Adhesive layers 36 and 38 bond substrates 14 and 40, and substrates 40 and 12 respectively.

It will be noted that in the preferred embodiments described above, the second substrate 14 typically includes a sealant layer of, for example, linear low density polyethylene or a blend of linear low density polyethylenes of varying density and/or melt index, with a saran coating applied to the linear low density polyethylene layer to provide the high relative humidity barrier properties necessary in a long-hold, shelf stable food package. In these embodiments, the saran coating typically functins not only in the capacity of a barrier layer, but also as a bonding surface for adhering the second substrate 14 either directly to first substrate 12 or to third substrate 40. It may be advantageous in some circumstances to coextrude or otherwise produce a multilayer substrate 14 in which a vinylidene chloride copolymer is disposed as an internal layer within a multilayer structure of the substrate. This may provide processing or economic advantages not obtained by utilizing a saran coating on a polyolefin layer.

Figure 4:
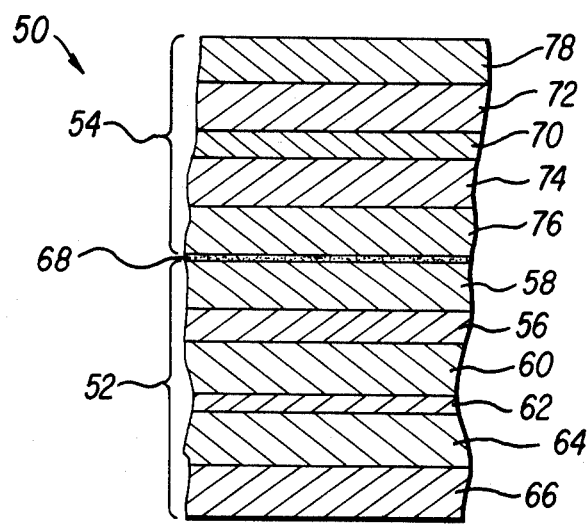
FIG. 4 is a schematic cross section of still another embodiment of the multilayer laminate in accordance with the invention.
Figure 5:
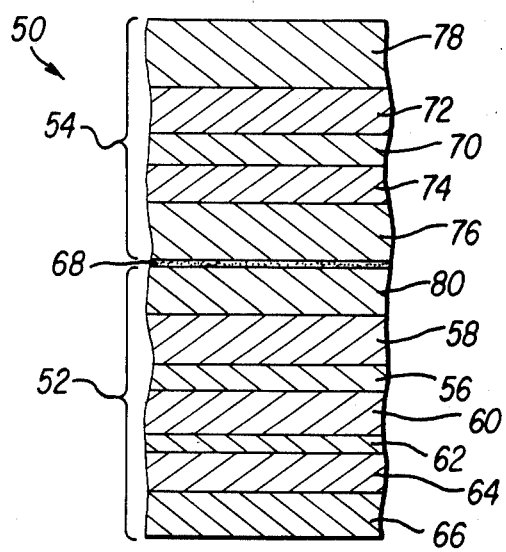
FIG. 5 is a schematic cross section of yet another embodiment of a multilayer laminate.
Figure 6:
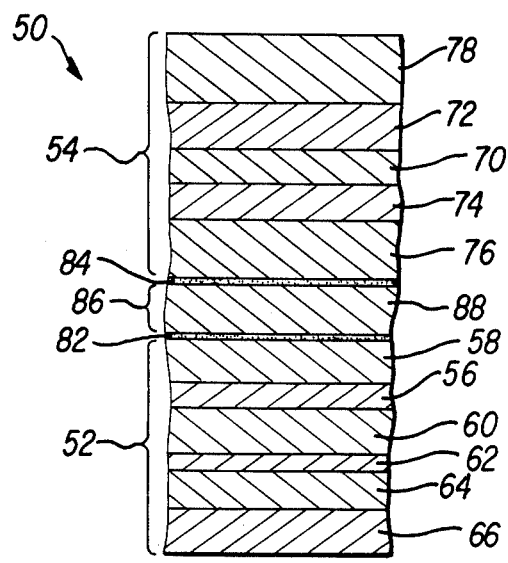
FIG. 6 is a schematic cross section of an additional embodiment of the multilayer laminate.

Such structures are schematically shown in FIGS. 4 through 6. In a two substrate embodiment, shown in FIG. 4, first substrate 52 is essentially the same as first substrate 12 of FIG. 1, and is bonded by any of various bonding mechanisms 68, including lamination adhesives, to second substrate 54.

Thus, substrate 52 includes a layer 56 of ethylene vinyl alcohol copolymer adhered on each surface thereof to polyamide layers 58 and 60 respectively. Tie layer 62 adheres polyamide layer 60 to layer 64 comprising a low density polyethylene. Sealant layer 66 comprises a linear low density polyethylene.

Substrate 54 comprises an internal layer 70, comprising vinylidene chloride copolymer, bounded on either side by layers 72 and 74 comprising an ethylene-unsaturated ester copolymer, preferably ethylene vinyl acetate copolymer. Suitable ethylene vinyl acetate copolymers are those available from El Paso Products Co., and designated PE 204 CS 95.

Bonding layer 76 is also an ethylene-unsaturated ester copolymer such as ethylene vinyl acetate copolymer.

The sealant layer 78 is preferably a linear low density polyethylene, which may be similar to those resins used in sealing layer 30 described above.

First substrate 52 may include an additional layer 80 extruded therewith, layer 80 preferably comprising a polyamide or copolyamide such as that of layer 34. This is shown in FIG. 5.

FIG. 6 of the drawings illustrates a thermoplastic laminate 50 having a first substrate 52, a second substrate 54, and a third substrate 86 comprising layer 88. The two opposite surfaces of layer 88 can provide bonding surfaces for adhering the third substrate 86 to the first and second substrates by means of adhesive layers 82 and 84 respectively. Layer 88 is preferably a biaxially oriented polyamide such as that described for layer 42.

Examples of laminates produced in accordance with the present invention are given below.

EXAMPLE 1

A linear low density polyethylene (Sclair) substrate of 2.0 mils thickness was coated with a coating of PV-864 unplasticized vinylidene chloride vinyl chloride copolymer (Solvay).

A multilayer film having the construction 90% Dowlex 2035+10% Antiblock/Norchem 3404 low density polyethylene/Plexar 3/Capron 8270F/EVAL EC-F101/Capron 8207F was produced by a cast coextrusion process, and then laminated to the coated substrate with adhesive, the saran coating and the Capron 8207F acting as the bonding layers for the laminate.

Water vapor transmission at 100° F. 100% RH for a laminate averaging about 6.32 mils thickness (for three samples) averaged about 0.24 grams/(24 hours, 100 square inches) (ASTM F 372). Oxygen transmission rates at 73° F., 0% RH for a laminate averaging about 6.51 mils thickness (for three samples) averaged about 0.3 cc STP(24 hours, square meter, atmosphere) (ASTM D-3985). The same ASTM test methodology was used for the remaining examples.

EXAMPLE 2

A laminate similar to that of Example 1 was prepared in a similar procedure, but having a blend of 70% Dowlex 2045, 30% Dowlex 2035, and a small amount of antiblock agent in the linear low density polyethylene substrate. Water vapor transmission at 100° F., 100% RH for a laminate averaging about 6.36 mils thickness averaged about 0.22 grams/(24 hours, 100 square inches). Oxygen transmission rates at 73° F., 0% RH, sample thickness averaging about 6.44 mils, averaged about 0.2 cc STP/(24 hours, square meter, atmosphere).

EXAMPLE 3

A laminate was prepared using procedures similar to those described above for Example 1, and having a similar coextruded structure. Instead of a coated linear low density polyethylene substrate, a substrate having the structure Dowlex 2045 and antiblock/Dowlex 2045/Alathon 3170/PV864/Alathon 3170/PE204CS95 was coextruded and laminated to the ethylene vinyl alcohol-containing structure. Alathon 3170 is an ethylene vinyl acetate copolymer available from Du Pont. PE 204CS95 is an ethylene vinyl acetate copolymer available for El Paso Polyolefins Company, and having a density at 23° C. of from about 0.9232 to about 0.9250 grams per cubic centimeter and a melt flow (ASTM D1238) of about 2.0 grams per ten minutes. This material contains from about 3.3 to about 4.1 percent vinyl acetate derived units. Samples averaging 6.16 mils thickness displayed a water vapor transmission rate of about 0.25 grams/(24 hours, 100 square inches) at 100° F., 100% RH. Samples averaging 6.34 mils thickness had an oxygen vapor transmission rate, at 73° F., 0% RH of about 0.2 cc STP/(24 hours, square meter, atmosphere).

EXAMPLE 4

A three-substrate laminate was prepared, substantially as described in Example 1, but with a third substrate made of a biaxially oriented nylon 6. The third substrate was laminated between and bonded to the first two substrates by means of lamination adhesive. A water vapor transmission rate of about 0.23 grams/(24 hours, 100 square inches) at 100% RH was obtained from laminates of 7.51 mils average thickness. An oxygen transmission rate of about 0.2 cc STP/(24 hours, square meter, atmosphere) at 73° F., 0% RH was obtained from laminates of 7.51 mils average thickness.

EXAMPLE 5

A three-substrate laminate was prepared substantially as described in Example 2, but with a third substrate as described in Example 4. The water vapor transmission rate was comparable to that of Example 4, at an average laminate thickness of 6.83 mils. An oxygen transmission rate of about 0.5 cc STP(24 hours, square meter, atmosphere) at 73° C., 0% RH was obtained from laminates of 7.10 mils average thickness.

Various changes and modifications to the invention can be made by one skilled in the art without departing from the scope of the claims as presented below.

What is claimed is:

1. A thermoplastic laminate comprising:
    (a) a first substrate comprising a layer of ethylene vinyl alcohol copolymer, a layer of a polyamide, and an outer layer of linear low density polyethylene; and
    (b) a second substrate bonded to the first substrate and comprising a vinylidene chloride copolymer, and an outer layer of linear low density polyethylene.
2. A laminate according to claim 1 wherein the first substrate comprises:
    (a) a first layer comprising a polyamide;
    (b) a second layer comprising an ethylene vinyl alcohol copolymer;
    (c) a third layer comprising a polyamide;
    (d) a tie layer; and
    (e) a sealant layer comprising a linear low density polyethylene.
3. A laminate according to claim 2 wherein the first substrate further comprises an additional layer disposed between the tie layer and sealant layer and comprising a low density polyethylene.
4. A laminate according to claim 2 wherein the first substrate further comprises an additional layer comprising a polyamide, said additional layer disposed on the surface of the first layer, and in bonding relationship to the second substrate.
5. A laminate according to claim 1 wherein the vinylidene chloride copolymer is a coating.
6. A laminate according to claim 1 wherein the second substrate comprises:
    (a) a sealant layer comprising a linear low density polyethylene;
    (b) intermediate layers each comprising an ethylene-unsaturated ester copolymer;
    (c) a core layer of vinylidene chloride copolymer disposed between the intermediate layers; and
    (d) an inner bonding layer comprising an ethylene-unsaturated ester copolymer.
7. A laminate according to claim 1 wherein the second substrate is bonded to the first substrate by means of a lamination adhesive.
8. A thermoplastic laminate comprising:
    (a) a first substrate comprising a layer of an ethylene vinyl alcohol copolymer and a layer of a polyamide;
    (b) a second substrate comprising a vinylidene chloride copolymer; and
    (c) a third substrate disposed between and bonded by a lamination adhesive to the first and second substrates and comprising a polyamide.
9. A laminate according to claim 8 wherein the first substrate comprises:
    (a) a first layer comprising a polyamide;
    (b) a second layer comprising an ethylene vinyl alcohol copolymer;
    (c) a third layer comprising a polyamide;
    (d) a tie layer; and
    (e) a sealant layer comprising a linear low density polyethylene.
10. A laminate according to claim 9 wherein the first substrate further comprises an additional layer disposed between the tie layer and sealant layer and comprising a low density polyethylene.
11. A laminate according to claim 8 wherein the second substrate comprises:
    (a) a sealant layer comprising a linear low density polyethylene, and
    (b) a bonding layer comprising a vinylidene chloride copolymer.
12. A laminate according to claim 11 wherein the vinylidene chloride copolymer is a coating on the sealant layer.
13. A laminate according to claim 8 wherein the second substrate comprises:
    (a) a sealant layer comprising a linear low density polyethylene;
    (b) intermediate layers each comprising an ethylene-unsaturated ester copolymer;
    (c) a core layer of vinylidene chloride copolymer disposed between the intermediate layers; and
    (d) an inner bonding layer comprising an ethylene-unsaturated ester copolymer.
14. A laminate according to claim 8 wherein the polyamide of the third substrate is biaxially oriented.
15. A process for making a thermoplastic laminate comprising:
    (a) coextruding a first substrate comprising a layer of ethylene vinyl alcohol, a layer of a polyamide, and an outer layer of linear low density polyethylene;
    (b) extruding a second substrate comprising a vinylidene chloride copolymer and an outer layer of linear low density polyethylene; and
    (c) adhering the first substrate to the second substrate.

16. A process for making a thermoplastic laminate comprising:
(a) extruding a first substrate comprising a layer of an ethylene vinyl alcohol copolymer and a layer of a polyamide;
(b) extruding a second substrate comprising a vinylidene chloride copolymer;
(c) extruding a third substrate comprising a polyamide; and
(d) adhering the first and second substrates to opposite surfaces of the third substrate by means of a lamination adhesive.

* * * * *